(12) United States Patent
Gentry et al.

(10) Patent No.: US 7,840,994 B2
(45) Date of Patent: Nov. 23, 2010

(54) METHOD AND APPARATUS FOR EFFICIENT CERTIFICATE REVOCATION

(75) Inventors: Craig B. Gentry, Mountain View, CA (US); Zulfikar Amin Ramzan, San Mateo, CA (US)

(73) Assignee: NTT Docomo, Inc., Tokyo (JP)

( * ) Notice: Subject to any disclaimer, the term of this patent is extended or adjusted under 35 U.S.C. 154(b) by 1484 days.

(21) Appl. No.: 10/542,799

(22) PCT Filed: Sep. 9, 2004

(86) PCT No.: PCT/US2004/029764

§ 371 (c)(1),
(2), (4) Date: Jul. 19, 2005

(87) PCT Pub. No.: WO2005/029445

PCT Pub. Date: Mar. 31, 2005

(65) Prior Publication Data

US 2006/0129803 A1 Jun. 15, 2006

Related U.S. Application Data

(60) Provisional application No. 60/504,253, filed on Sep. 19, 2003.

(51) Int. Cl.
*G06F 7/04* (2006.01)
*H04L 29/06* (2006.01)

(52) U.S. Cl. .................. 726/10; 713/156; 713/157; 713/158

(58) Field of Classification Search ......... 713/156–158; 726/10
See application file for complete search history.

(56) References Cited

U.S. PATENT DOCUMENTS

| 5,903,651 | A | 5/1999 | Kocher |
| 6,097,811 | A * | 8/2000 | Micali ................ 713/186 |
| 6,292,893 | B1 | 9/2001 | Micali |
| 6,301,659 | B1 | 10/2001 | Micali |
| 6,385,608 | B1 * | 5/2002 | Mitsuishi et al. ........... 707/6 |
| 6,487,658 | B1 | 11/2002 | Micali |
| 6,766,450 | B2 | 7/2004 | Micali |
| 7,178,029 | B2 * | 2/2007 | Ansper et al. ............ 713/176 |
| 7,260,572 | B2 * | 8/2007 | Min et al. .................. 707/5 |
| 2002/0165824 | A1 | 11/2002 | Micali |
| 2002/0184504 | A1* | 12/2002 | Hughes ................. 713/177 |

FOREIGN PATENT DOCUMENTS

EP 0 932 109 A2 7/1999

OTHER PUBLICATIONS

Elwailly, Faird et al., "QuasiModo: More Efficient Hash Tree-Based Certificate Revocation" Sep. 5, 2003, pp. 1-7.*

(Continued)

*Primary Examiner*—Michael Pyzocha
(74) *Attorney, Agent, or Firm*—Blakely, Sokoloff, Taylor & Zafman LLP

(57) ABSTRACT

Revocation of digital certificates in a public-key infrastructure is disclosed, particularly in the case when a certificate might need to be revoked prior to its expirations. For example, if an employee was terminated or switched roles, his current certificate should no longer be valid. Accordingly, novel methods, components and systems are presented for addressing this problem. A solution set forth herein is based on the construction of grounded dense hash trees. In addition, the grounded dense hash tree approach also provides a time-communication tradeoff compared to the basic chain-based version of NOVOMODO, and this tradeoff yields a direct improvement in computation time in practical situations.

20 Claims, 10 Drawing Sheets

OTHER PUBLICATIONS

William Aiello, et al., "Fast Digital Identity Revocation", Advances in Cryptology, 18th Annual Intl. Cryptology Conference, Aug. 23-27, 1998, XP-000792173, pp. 137-152.

Irene Gassko, et al., "Efficient and Fresh Certification", Lecture Notes in Computer Science, Jan. 18, 2000, XP-002164003, pp. 342-353.

W. Aiello, S. Lodha, and R. Ostrovsky, "Fast digital identity revocation," *In Proceedings of Asiacrypt '01*, 2001.

G. Ateniese, J. Camenisch, M. Joye, and G. Tsudik, "A Practical and Provably Secure Coalition-Resistant Group Signature Scheme," *Proceedings of CRYPTO 2000*.

M. Bellare and P. Rogaway, "Random oracles are practical: A paradigm for designing efficient protocols," *Proc. First Annual Conference on Computer and Communications Security, ACM*, 1993.

D. Boneh, B. Lynn, and H. Shacham, "Short signatures from the Weil pairing," *In proceedings of Asiacrypt '01*, 2001.

F. Elwailly and Z. Ramzan, "QuasiModo: More Efficient Hash Tree-Based Certificate Revocation," Manuscript, 2003.

I. Gassko, P. S. Gemmell, and P. MacKenzie, "Efficient and fresh certification," *In proceedings of PKC 2000*, 2000.

S. Goldwasser, S. Micali, and R. L. Rivest, "A Digital Signature Scheme Secure Against Adaptive Chosen-Message Attacks," *SIAM Journal on Computing*, 17(2):281-308, 1988.

Y-C. Hu, A. Perrig, and D. Johnson, "Efficient security mechanisms for routing protocols," *Proceedings of the 10th Annual Network and Distributed System Security Symposium (NDSS)*, 2003.

M. Jakobsson, J-P. Hubaux, and L. Buttyan, "A micropayment scheme encouraging collaboration in multi-hop cellular networks," *Proceedings of the 7th International Conference on Financial Cryptography*, 2003.

M. Jakobsson, T. Leighton, S. Micali, and M. Szydlo, "Fractal merkle tree representation and traversal," *Proceedings of the Cryptographer's Track, RSA Conference*, 2003.

S. Jarecki and A. Odlyzko, "An efficient micropayment system based on probabilistic polling," *Proceedings of the 1st International Conference on Financial Cryptography*, 1997.

C. Jutla and M. Yung, "PayTree: Amortized signatures for flexible micropayments," *Proceedings of the Second USENIX Workshop on Electronic Commerce*, 1996.

S. Kim and H. Oh, "An atomic micropayment system for a mobile computing environment," *IEICE Transactions of Information and Systems*, E84-D(6):709-716, 2001.

P. Kocher, "On Certificate Revocation and Validation," *Proceedings of the 2nd International Conference on Financial Cryptography*, 1998.

R.J. Lipton and R. Ostrovsky, "Micro-Payments via Efficient Coin Flipping," *Proceedings of the 2nd International Conference on Financial Cryptography*, 1998.

A. Malpani, R. Housely, and T. Freeman, "Simple Certificate Validation Protocol—(SCVP)," IETF-Draft -draft-ietf-pkix-scvp-12.txt, Jun. 2003.

R. C. Merkle, "Protocols for Public-Key Cryptosystems," *IEEE Symposium on Security and Privacy*, 1980.

S. Micali, "Efficient Certificate Revocation," *MIT/LCS/TM 542b*, Massachusetts Institute of Technology, 1996.

S. Micali, "Efficient Certificate Revocation," *Proceedings of the RSA Data Security Conference*, 1997. Also U.S. Patent No. 5,666,416.

S. Micali, "NOVOMODO: scalable certificate validation and simplified PKI management," *Proceedings of the 1st Annual PKI Research Workshop*, 2002.

M. Myers, R. Ankney, A. Malpani, S. Galperin, and C. Adams, "X.509 internet public key infrastructure Online Certificate Status Protocol—OCSP," *Internet RFC 2560*, Jun. 1999.

M. Naor and K. Nissim, "Certificate Revocation and Certificate Update," *Proceedings of USENIX Security*, 1998.

National Bureau of Standards, NBS FIPS PUB 81: *DES Modes of operation*, 1980.

National Institute of Standards, FIPS 180-1: Secure hash standard, 1995.

M. Pierce and D. O'Mahony, "Micropayments for Mobile Networks," *Proceedings of European Wireless*, 1999. Winner of Best Paper Award.

R. L. Rivest, "The MD5 message digest algorithm," *Internet RFC 1321*, April.

R. L. Rivest, "Electronic Lottery Tickets as Micropayments," *Proceedings of the 2nd International Conference on Financial Cryptography*, 1997.

R. L. Rivest and A. Shamir, "PayWord and MicroMint—Two Simple Micropayment Schemes," *CryptoBytes (RSA Laboratories)*, 2(1), 1996. *Proceedings of 1996 International Workshop on Security Protocols*.

R. L. Rivest, A. Shamir, and L. Adleman, "A Method for Obtaining Digital Signaturese and Public-Key Cryptosystems," *Communications of the ACM*, 21:120-126, 1978.

H. Tewari and D. O'Mahony, "Real-Time Payments for Mobile IP," *IEEE Communications*, 41(2): 126-136, 2003.

H. Tewari and D. O'Mahony, "Real-Time Payments for Mobile IP," *IEEE Communications*, 41(2): 126-136, 2003.

D. Wheeler, "Transactions Using Bets," *Proceedings of Fourth Cambridge Workshop on Security Protocols*, 1996.

J. Zhou and K-Y. Lam, "Undeniable Billing in Mobile Communication," *Proceedings of MOBICOMI*, 1998.

* cited by examiner

METHOD AND APPARATUS FOR EFFICIENT CERTIFICATE REVOCATION

PRIORITY

The present patent application is a National Phase Application of International Application No. PCT/US2004/029764, filed Sep. 9, 2004, which claims priority to the corresponding provisional patent application Ser. No. 60/504,253, titled, "METHOD AND APPARATUS FOR EFFICIENT CERTIFICATE REVOCATION" filed on Sep. 19, 2003 incorporated herein by reference. The present application claims priority to both International Application No. PCT/US2004/029764, filed Sep. 9, 2004, and provisional patent application Ser. No. 60/504,253, filed Sep. 19, 2003.

FIELD OF THE INVENTION

The present invention relates to the field of cryptography; more particularly, the present invention relates to revocation of certificates.

BACKGROUND OF THE INVENTION

As movement continues to an increasingly online world, the use of public-key cryptography will be prevalent. Underlying such use, a public-key infrastructure that constitutes the policy, procedures, personnel, and facilities for binding public keys to authorizations must be established. The public-key infrastructure is managed by a certificate authority (CA) who not only issues digital certificates that bind public keys to identities or authorizations, but also who manages these digital certificates. When issuing a certificate, the certificate authority must be sure to check that a user's credentials are accurate. However, if a certificate needs to be revoked, procedures may get more complex.

While a certificates validity may be limited by an expiration date, there are instances when a certificate must be revoked prior to its expiration date. For example, a key holder may change his affiliation or position, or even worse his private key may have been compromised. Accordingly, some mechanism is needed for revoking a certificate.

One common approach for revoking a certificate is through the use of a certificate revocation list (CRL) that is a digitally signed and time-stamped list issued by the certificate authority specifying which certificates have been revoked according to some identifier like a serial number, a name, an e-mail address, etc. These CRLs must be distributed periodically, even if there are no changes, to prevent any type of replay attack. While this approach may appear simple, the management of CRLs may be unwieldy with respect to communication, search, and verification costs.

An alternate approach is through the use of a Certificate Revocation Tree (CRT). A CRT is a Merkle tree in which each leaf is associated with groups of revoked certificates. One can then form logical proofs using the leaf elements, and these proofs can be validated through properties of Merkle Trees.

Rather than posting full-fledged lists of revoked certificates, the certificate authority may instead choose to answer queries about specific certificates using an on-line approach. This approach is used in Online Certificate Status Protocol (OCSP). However, this approach has limitations. To begin with, the validity proof consists of a digital signature that may be quite long; for example, with RSA signatures, and a 1024-bit key, the signatures would be 1024-bits long. Moreover, 1024-bit keys are on the low end with respect to security. For any more long-term needs, a key along the lines of 2048-bits would have to be considered. Since the certificate authority must be very secure, its signing key will be correspondingly longer. Thus, a key size of 2048-bits for RSA is not unreasonable. In addition, signing each response may be computationally infeasible for the certificate authority who may have to handle numerous requests. If the certificate authority is a single centralized machine, then that causes a major scalability issue because all requests are routed through it, and it has to compute a digital signature for each unique request. By trying to introduce some load balancing and distributing the certificate authority, a security risk is introduced, as the sensitive signing key will be replicated.

Micali addressed these problems in an elegant scheme referred to as NOVOMODO. The NOVOMODO scheme works with any standard certificate format such as X.509 and allows a certificate authority to provide validity status of a certificate at any pre-specified time interval such as a day, an hour, etc. NOVOMODO uses a hash chain together with a single digital signature. The advantage is the cost of the single signature is amortized over many validity proofs. However, NOVOMODO requires traversal on the hash chains with time proportional to the number of periods that have passed between two queries. A natural extension pointed out by Naor and Nissim is to use Merkle trees (M. Naor and K. Nissim, "Certificate Revocation and Certificate Update," Proceedings of USENIX Security, 1998). In this approach, the verifier has to compute $\lceil \log_2(365) \rceil + 1$ hashes to validate a certificate, though the validity proof now consists of $\lceil \log_2(365) \rceil + 1$ hash values. On average, this approach is desirable compared to the original NOVOMODO approach since the average verification complexity has gone down substantially. However, there are still some disadvantages:

1. If the time between verifications is smaller than $\lceil \log_2(365) \rceil + 1$, then the original NOVOMODO scheme requires less time for the verifier to validate the certificate.
2. The proof size in the original NOVOMODO scheme is always 1 hash value, which is much smaller than the proof size of the extended NOVOMODO scheme.

For more information on NOVOMODO, see S Micali, "NOVOMODO: Scalable Certificate Validation and Simplified PKI Management, Proceedings of the $1^{st}$ Annual PKI Research Workshop, 2002.

Another approach referred to herein as the ALO approach, is due to Aiello, Lodha, and Ostrovsky and uses a NOVOMODO-like scheme in conjunction with a mechanism for partitioning users into subsets in order to provide validation proofs for multiple users simultaneously. See W. Aiello, S. Lodha and R. Ostrovsky, "Fast Digital Identity Revocation," Proceedings of Asiacrypt '01, 2001.

The ALO scheme assigns a separate NOVOMODO-like hash chain to each such user subset $S_i$. Then, at a given interval, if T denotes the set of users with revoked certificates, then the certificate authority first computes the covering indices $i_1, \ldots, i_k$ with $T = \cup_{j+1}^{k} S_{i_j}$. It then provides validity proofs for each subset $S_{i_j}$. This allows groups of users to be validated simultaneously. There are some drawbacks to this approach. First, there is additional overhead with respect to constructing subsets and having chains for each subset. At a bare minimum, the singleton subsets have to be created (which basically yields the original NOVOMODO scheme). Therefore, if one were to actually get an improvement through the ALO scheme, one would need to compute additional subsets, which means that additional work is required. Second, as in the original NOVOMODO scheme, the number of hash computations is proportional to the interval between validation checks; so might be large.

SUMMARY OF THE INVENTION

A method and apparatus for certificate revocation is disclosed. In one embodiment, the method comprises generating certificate data having validity and revocation targets, where the validity target is a value of a root of a grounded dense hash tree. The method also includes issuing a certificate with the certificate data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
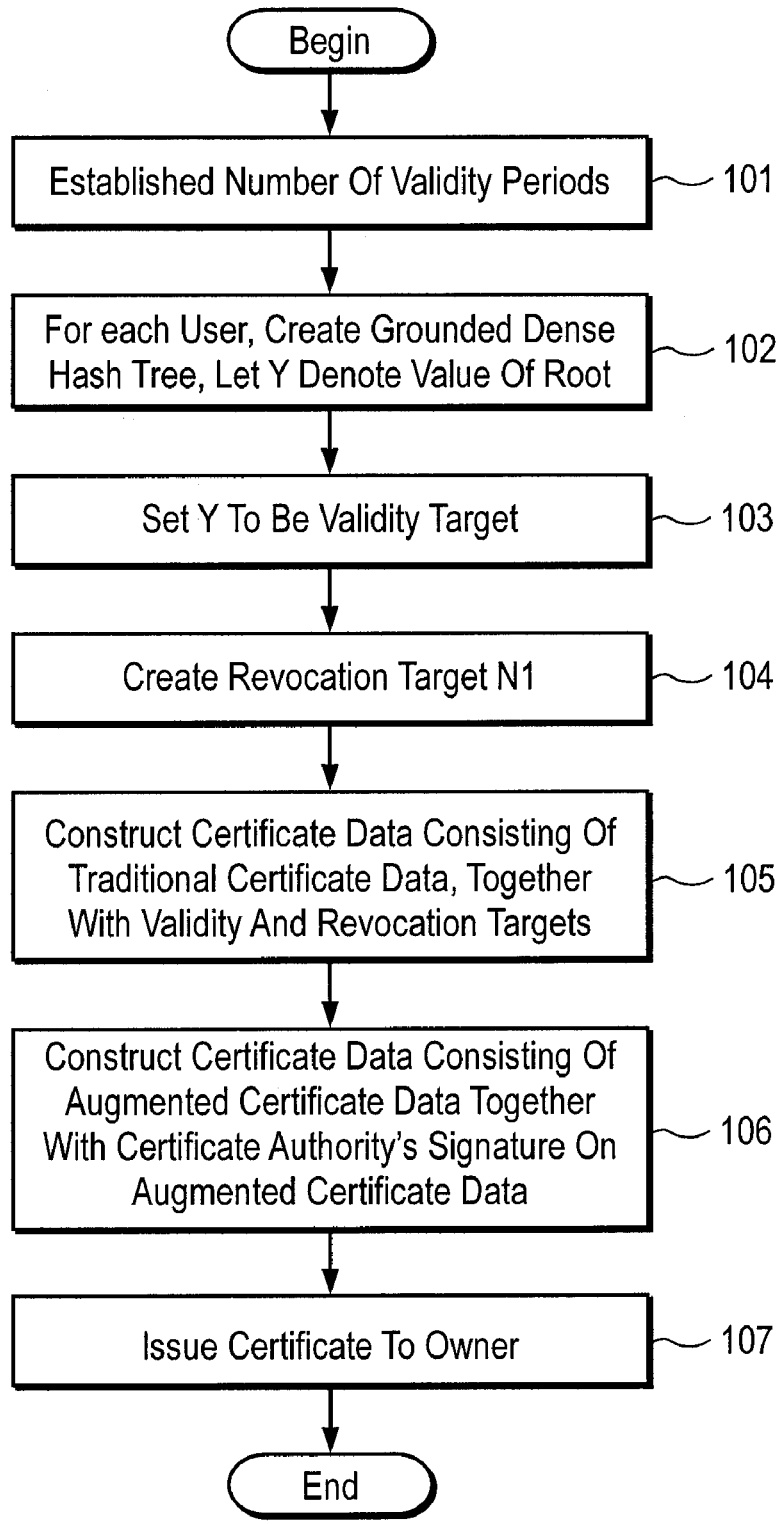
FIG. 1 illustrates a flow diagram of one embodiment of a process for the Certificate Authority in the set up phase.

Accordingly, methods, components, and systems are provided for addressing the above-referenced issues. In one embodiment, grounded dense hash trees (GDH) are used as an alternative to using Merkle trees. In this approach, rather than starting at the leaves as is done in a Merkle Tree, the process starts with alternate interior nodes of the tree. The result is an immediate improvement in both the overall verification complexity, as well as the communication complexity over the Merkle tree based scheme of Naor and Nissim. Moreover, because the proofs of validity are smaller, they are likely to fit within a single packet; therefore, the extra communication required in practice is negligible.

In one embodiment, grounded dense hash trees are used to construct proofs that may apply to multiple users simultaneously. Thus, the certificate authority only needs to publish a few proofs that can then be used to validate the certificates of many users.

In one embodiment of the present invention, a system allows a verifier V to determine the validity of a certificate belonging to an owner issued by a certificate authority using work that is at most $$\Theta(\lfloor \log p_t \rfloor - \lfloor \log p_c \rfloor),$$

where $p_t$ represents the current period and $p_c$ represents the last period for which validity was checked assuming that computations from previous validity checks have been cached. If previous validity checks have not been cached, then $\Theta(\lfloor \log p_t \rfloor)$ work is required. In both cases, the proof size is proportional to the amount of work required to perform the validity check.

One embodiment of a method is provided by which the certificate authority creates a validation target for a single certificate owner using a grounded dense hash tree.

Another embodiment of the present invention sets forth a method by which the certificate authority constructs proofs of validity using these grounded dense hash trees. The proof of validity is of the size at most O(log(t)), where t is the validity period (e.g., t=14 means being on day 14 out of 365).

Other embodiments of the present invention include a method by which a verifier verifies the validity of a proof issued by the certificate authority requiring work that is at most O(log(t)) where t is the validity period.

Embodiments of the present invention include components for the certificate authority, verifier, and owner that perform the operations of the methods described herein.

One embodiment of the present invention includes a system for allowing a verifier to publish a proof of validity for multiple certificates, thereby allowing a verifier to determine the validity of a certificate belonging to a plurality of certificate owners concurrently. One embodiment of the present invention includes a method by which the certificate authority constructs a single proof for the validity of multiple certificates. Another embodiment of the present invention includes a method by which the verifier verifies the proof issued by the certificate authority.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language; It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Preliminaries

In the model described herein, there is a certificate authority, a certificate owner or holder (Owner), and a certificate verifier. In the following discussion, the Owner has a certificate issued by the certificate authority. Naturally, the concept of a certificate authority may apply more generally to any authority responsible for issuing access control privileges or authorizations to a plurality of individuals. The concept of an owner may be a specific human being operating a computer or an entity, such as, for example, a World Wide Web server. Similarly, the verifier may be a specific human being operating a computer or may be an entity like an access control server determining if it should permit access to certain services.

In a given transaction, the certificate verifier wishes to ascertain that the certificate has not been revoked prior to its expiration date. To do so, the certificate verifier asks the certificate authority for a proof of validity or a proof of revocation.

Preferably, an open or closed public-key infrastructure is used such that both the certificate authority and the Owner have public-private key pairs. A key pair is referred to herein as (Sk, Pk) where Sk is the private signing key for computing the signature on a message, and Pk is the public verification key corresponding to Sk. For purposes herein, the equality DS=(KG, Sign, Vf) denotes a digital signature scheme that is secure against existential forgery under adaptive chosen message attack in the sense of Goldwasser, Micali, and Rivest, in "A Digital Signature Scheme Secure Against Adaptive Chosen-Message Attacks," SIAM Journal on Computing, 17(2): 281-308, 1988. KG denotes the key generation algorithm, Sign(Sk, M) denotes the signing algorithm that outputs a signature $\sigma$ on message M under signing key Sk (the signing algorithm may be randomized), and Vf(Pk, M, $\sigma$) $\in$ {0,1} denotes the verification algorithm that evaluates to 1 if the signature $\sigma$ on message M is correct with respect to the public key Pk. For clarity, subscripts are used to denote keys that belong to specific individuals. So, the key pair for HSP is ($Pk_{HSP}$, $Sk_{HSP}$) and the key pair for U is ($Pk_U$, $Sk_U$). The key generation algorithm KG may take as an input a security parameter that specifies the lengths of the keys it should generate. Therefore, for a certificate authority, the key length might be larger than for a typical certificate owner, especially since the consequences of compromising the former's key is likely to be far more devastating the consequences of compromising the latter's key.

Let $\{0, 1\}^*$ denote the set of all bit strings. For a bit string s, its length is denoted by $|s|$. Let H denote a cryptographic compression function that takes as input a b-bit payload as well as a v-bit initialization vector (IV), and produces a v-bit output. In one embodiment, $b \geq 2v$, which holds for all well-known constructions in use. For the constructions described herein, typically $b=2v$. In one embodiment, these cryptographic compression functions are collision resistant; that is, finding two distinct inputs $m_1 \neq m_2$ such that $H(IV, m_1) = H(IV, m_2)$ is difficult. In one embodiment, the IV is fixed and publicly known. For notational simplicity, the IV is not always explicitly listed as an argument in the hash function. Practical examples of such cryptographic compression functions are found in SHA-1 or MD5. The compression function in the former has an output and IV size of 20-bytes whereas for the latter, the size is 16-bytes. Both have a 64-byte payload size. In one embodiment, no operation is on data larger than the compression function payload size; however there are numerous standard techniques such as iterated hashing or Merkle-trees for doing so. For simplicity, the term hash function is used instead of compression function, where it is understood that a hash function can take arbitrary length strings $\{0,1\}^*$ and produce a fixed length output in $\{0,1\}^v$. The symbol H is used to denote such a function. It is desirable to use hash functions that would be one-way and collision resistant.

For a length preserving function $f:\{0,1\}^n \rightarrow \{0,1\}^n$ an integer $i \geq 1$, let $f^i$ denote its f-fold composition; that is, $f^i(x)=f(x)$ for $i=1$ and $f^i(x)=f(f^{i-1}(x))$ for $i>1$. The function f is a one-way function if, given f(x) where x is randomly chosen, it is hard to find a pre-image z such that $f(z)=f(x)$, except with negligible probability. A one-way function f is said to be one way on its iterates if for any i, given $f^i(x)$, it is difficult to find a pre-image z such that $f(z)=f^i(x)$, except with negligible probability. In practice, one often constructs a candidate function that is one way on its iterates by starting with a hash function H and padding portion of the payload to make it length preserving.

Finally, for a real number r, $\lceil r \rceil$ is the ceiling of r, i.e., the smallest integer value greater than or equal to r. Similarly, $\lfloor r \rfloor$ denotes the floor of r, i.e., the largest integer value less than or equal to r.

Merkle Trees

One important notion is that of a Merkle tree, which can be described as follows. Suppose there are m values $x_1, \ldots, x_m$ each of which is $\{0,1\}^n$. For simplicity, assume that m is a power of 2. Let $H:\{0,1\}^{2n} \to \{0,1\}^n$ be a cryptographic hash function that maps 2n-bit strings to n-bit strings. The Merkle tree associated with $x_1, \ldots, x_m$ under hash function H is a balanced binary tree in which each node is associated with a specific value Value(v). There are m leaves, and for each leaf $l_i$, Value($l_i$)=H($x_i$), $1 \leq i \leq m$. Note that we abuse notation since the $x_i$ are in $\{0,1\}^n$, but the domain of H is $\{0,1\}^{2n}$; in this case, assume that H is padded appropriately. For an interior vertex v, let $C_0(v)$ and $C_1(v)$ denote its left and right children. Let "o" denote the concatenation operation. Then, Value(v)=H(IV,Value($C_0(v)$)o Value($C_1(v)$)).

Although only the Merkle tree is viewed as having leaves with values of the form Value $l_i$=H($x_i$), the Merkle tree has yet another layer of m vertices underneath the leaves. This set of vertices has the values $x_i$, and each such vertex is connected to the vertex with: the value H($x_i$).

Merkle trees may be used to digest data in digital signatures, where the signed digest corresponds to the value associated with the root. Also, if the underlying compression function is collision resistant, then it will be hard to find two different messages whose Merkle root value is identical.

Grounded Dense Hash Trees

The process of setting up Grounded Dense Hash (GDH) trees is described below. Ostensibly, these look like Merkle trees except that some of the interior vertices are carefully numbered. The power of using such trees is that a subset of the internal nodes can be directly utilized in a certificate revocation scheme. The upshot is an improvement in both the time complexity and communication complexity of such schemes. Again the process starts with m values, $x_1, \ldots, x_m$. For simplicity, suppose that m is equal to 2 k for some positive integer k. A tree is set up as follows. At the bottom layer, there are m vertices, which will be only-children vertices in the sense that they have no siblings. Next, as is done in a Merkle Tree, a balanced binary tree of depth k+1 is constructed and values are assigned to each of the vertices. This tree resides on top of the bottom-level m vertices. Values are assigned as follows. The bottom level m vertices take on the values $x_1, \ldots, x_m$ respectively. For the layer that is directly on top of the bottom layer, m vertices are constructed, and the n-bit value f($x_i$) is assigned to the $i^{th}$ such vertex, where $f:\{0,1\}^n \to \{0,1\}^n$ is a length-preserving one-way function. That is, if $l_i$ is such a vertex, then Value $l_i$=f($x_i$), for $1 \leq i \leq m$. Now, let $H:\{0,1\}^{2n} \to \{0,1\}^n$ be a cryptographic hash function. Then, for any interior node v that is above the bottom two layers, Value(v)=H(IV,Value($C_0(v)$)o Value($C_1(v)$)).

Another way to characterize the same tree is as follows. There are 3 m−1 vertices. These are respectively: $l_1, \ldots, l_m$, $l'_1, \ldots, l'_m$, and $v_1, \ldots, v_{m-1}$. The values are assigned as follows. Value ($l_i$)=$x_i$ and Value ($l'_m$)=f($x_i$), for $1 \leq i \leq m$. Next, let $\lambda(i)=2(i-m/2)+1$ and let $\rho_i=2(i-m/2)+2$. For, $i \in \{m/2, m/2+1, \ldots, m-1\}$, the following holds:

Value($v_i$)=H(Value($l'_{\lambda(i)}$)o Value($l'_{\rho_i}$)).

Finally, for $i \in \{, \ldots, m/2-\}$, we have

Value($v_i$)=H(Value($v_{2i}$)o Value($v_{2i+1}$))

This constitutes the assignment of values to the vertices. The following describes the directed edges. At a high level, a directed edge is next from a vertex u to a vertex w if Value(u) was explicitly used to calculate Value(w). More precisely, the directed edges can be described as such. There is a directed edge from $l_i$ to $l'_i$, for $1 \leq i \leq m$. For $i \in \{m/2, m/2+1, \ldots, m-1\}$, a directed edge exists from $l'_{\lambda(i)}$ to $v_i$ and a directed edge from $l'_{\rho(i)}$ to $v_i$. Finally, for $i \in \{1, \ldots, m/2-1\}$, a directed edge exists from $v_{2i}$ to $v_i$, and a directed edge from $v_{2i+1}$ to $v_i$.

Next, the following two coloring is applied to the nodes in the tree. The root is colored white. The left child of the root takes the color grey and the right child of the root takes the color white. Working down the tree for every vertex, each vertex is colored grey if it is a left child of its parent or white if it is a right child of its parent. If a vertex does not have any siblings (as is the case with the $l_1$ vertices), then it is colored grey; that is, an only child can be viewed as being simultaneously a left vertex and a right vertex. Note that other coloring schemes may be used, as long as for any two vertices that are siblings, only one can be colored. Similarly, other numbers are also possible.

Finally, the grey nodes are numbered in a breadth-first manner. That is, starting at the top of the tree, and working down to each consecutive level, each grey node is numbered sequentially from left to right. As an illustrative example, consider when m=4. In such a case, the number one is assigned to the left child of the root. The number two is assigned to the left child of the left child of the root. The number three is assigned to the left child of the right child of the root. The number four is assigned to the only child of the left child of the left child of the root. The number five is assigned to the only child of the right child of the left child of the root. The number six is assigned to the only child of the left child of the right child of the root. Finally, the number seven is assigned to the only child of the right child of the right child of the root. At first, the idea of numbering the grey vertices may seem somewhat unnatural, but the purpose of doing so is that the $i^{th}$ grey vertex will be involved in the validation proof at period i.

Figure 7:
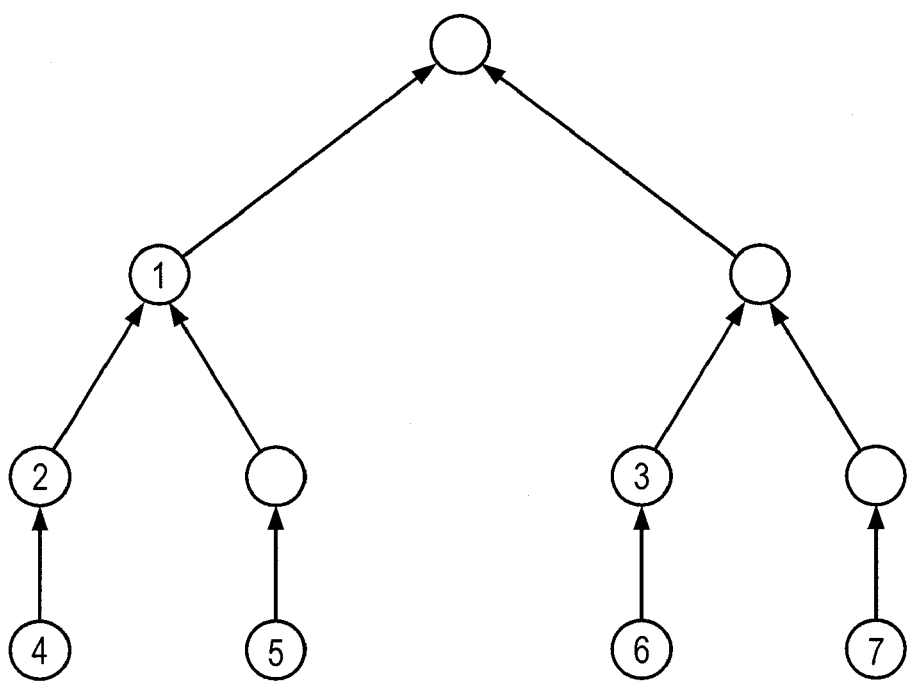
FIGS. 7 and 8 illustrate an exemplary grounded dense hash tree as compared to a Merkle Tree.
Figure 8:
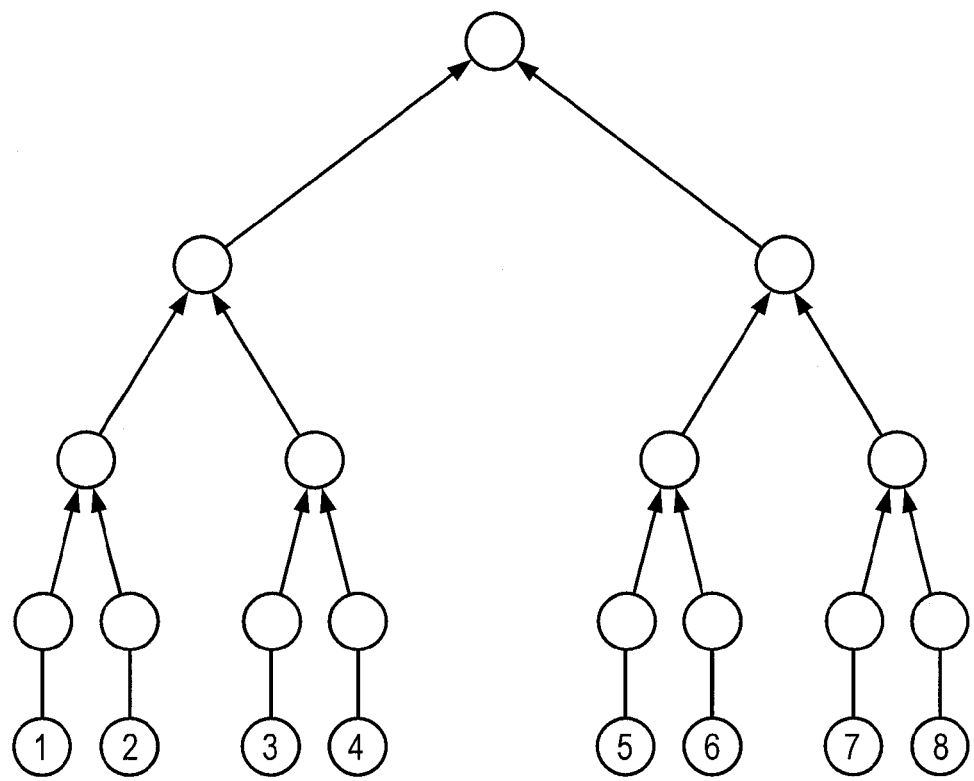

The $i^{th}$ grey vertex is referred to by gv(i). FIGS. 7 and 8 illustrate a comparison of a grounded dense hash tree labeling that can accommodate a revocation scheme with 7 periods. FIG. 7 is a grounded dense hash with 11 vertices, which can be used for 7 periods. Each interior node has value that is the hash of the values of its children. Every grey vertex is numbered sequentially in breadth first order. FIG. 8 is a Merkle tree that enables 8 periods. The basic part of the tree has 15 vertices, but there are 8 additional implicit vertices, which hang off the bottom of the tree for the lower-level hashes. The tree can be used for 8 periods. By using interior nodes, a more compact tree is observed. That is, a Merkle tree that accommodates 8 periods requires more than twice as many vertices as the grounded dense hash tree.

In general, a grounded dense hash tree with m leaves has 3 m−1 vertices and can accommodate 2 m−1 periods. A Merkle tree with m leaves also has 3 m−1 vertices, but can only accommodate m periods. The performance improvement from the grounded dense hash tree is 2−1/m, which approaches 2 as m gets large.

The notion of the co-nodes for a given vertex in a GDH tree is used in the following. For a vertex v, CoNodes(v) is the set of siblings of the vertices on the path from v to the root. More formally, if Sib(v) and Parent(v) denote v's sibling and parent respectively, then:

$$CoNodes(v) = \begin{cases} 0 \\ \{Sib(v)\} \cup CoNodes(\text{Parent}(v)) \end{cases}$$

if v is the root otherwise. Finally, for a set of co-nodes, Value(CoNodes(v)) denotes the values associated with the co-nodes of a vertex v. The analogous notion of co-nodes exists for Merkle trees.

Given the co-nodes, one embodiment of a process for calculating the root value is as follows. Suppose that the value associated with the $i^{th}$ grey vertex is v and suppose that the values of siblings of all the vertices on the path from the $i^{th}$ grey vertex to the root vertex are $v_1, \ldots v$. Then, the root value can be calculated as h where $h_1=H$ (v o $v_1$) and $h_i=H$ ($[h_{i-1}, v_i]$) where $[h_i, v_i]$ equals $v_i$ o $h_i$ if $v_i$ is a left child or $h_i$ o $v_i$ if $v_i$ is a right child.

Figure 9:
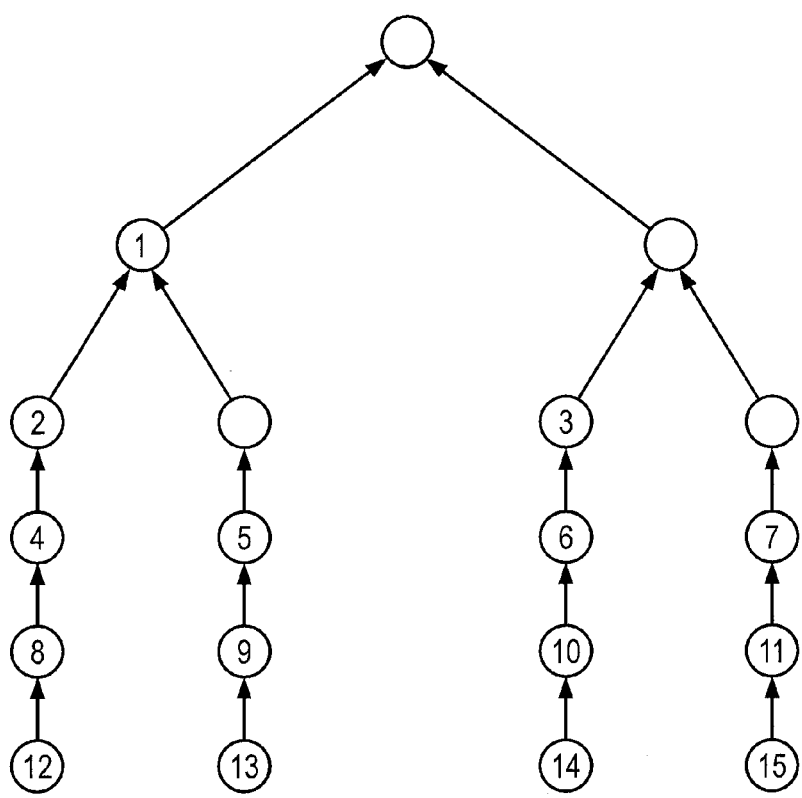
FIG. 9 illustrates a k-chained grounded dense hash tree.

The notion of a grounded dense hash tree is extended to a k-chained grounded dense hash tree as follows. The bottom level vertices are viewed as hash chains of length 1. They can be replaced with hash chains of length k. This extension provides a middle ground between the tradeoffs achieved from grounded dense hash trees and regular hash chains. See FIG. 9 for an illustration. FIG. 9 is a k-chained grounded dense hash where k=3. Note that the tree in FIG. 9 looks like a grounded dense hash tree, with the exception that the bottom layer vertices are replaced with hash chains.

NOVOMODO

The NOVOMODO scheme of Micali is described below. The scheme can be divided into three phases: a set up phase in which the certificate authority issues a certificate to a user, an update phase in which the certificate authority provides an efficient proof of revocation or validity, and a verification phase wherein a user determines the status of the owner's certificate.

Set Up

Let f be a function that is one way on its iterates. Let D denote traditional certificate data (e.g., a serial number, a string that serves as the user's identity, an issue date, and an expiration date). Let p denote the number of periods in the certificate scheme. For simplicity, in one embodiment, p equals 365. The certificate authority associates two numbers with the certificate data D. These two numbers, $y_p$ and N, are computed as follows. The certificate authority selects values $y_0$ and $N_0$ at random from $\{0,1\}^n$ and sets $y_p=f^p(y_0)$ and $N_1=f(N_0)$. The value $y_p$ is the validity target and $N_1$ is the revocation target for reasons that will be made clear below. The certificate consists of the augmented data $\{D, y_p, N_1\}$ together with the certificate authority's signature on this data.

Periodic Certificate Updates

The directory is updated each period (for example, if p=365, then the update interval might be daily for certificates that are valid for one year). At period i, if the certificate is valid, then the certificate authority sends out $y_{p-i}=f^{p-i}(y_0)$. If the certificate has been revoked, the certificate authority sends out $N_0$.

Verifying Certificate Status

Suppose that the user wants to verify the status of a certificate at period i. If the certificate authority claims the certificate has been revoked, then the user takes the value $N_0$ sent by the certificate authority and checks if indeed $N_1=f(N_0)$. Note that the user knows $N_1$ since it is in the certificate. In a similar vein, if the certificate authority claims the certificate has not been revoked, then the user takes the value $y_{p-i}$ sent by the certificate authority and checks if $f^i(y_{p-i})=y_p$. Again, note that the user knows $y_p$.

NOVOMODO with Merkle Trees

The following is a straightforward extension of NOVOMODO to a Merkle Tree, which was described in "Certificate Revocation and Certificate Update," M. Naor and K. Nissim, Proceedings of USENIX Security, 1998 and "Efficient and Fresh Certification," L Gassko et al., Proceedings of PKC 2000, 2000. The certificate authority creates a Merkle tree with 2 p leaves $l_1, \ldots l_{2p}$, each of which is assigned a pseudorandom value and signs the root. The leaves are numbered left to right from 1 to 2 p. At time period i, if the certificate is valid, then the certificate authority sends out Value($l_{2i}$) and Value(CoNodes($l_{2i}$)).

NOVOMODO with Basic Dense Hash Trees

As pointed by Elwailly and Ramzan in "QuasiModo: More Efficient Hash Tree-Based Certificate Revocation," F. Elwailly and Z. Ramzan, Manuscript, 2003, the Merkle tree in NOVOMODO can be replaced by a dense hash tree. This looks like a grounded dense hash tree except that the bottom layer leaves are missing. Using dense hash trees provides a factor of 1.5 improvement over Merkle trees, whereas the grounded dense hash tree described herein offers a factor of 2 improvement.

Dense Hash Trees for Single Certificate Revocation

Embodiments of the present invention are designed to provide secure and efficient certificate revocation methods, components, and systems that allow a certificate authority to produce compact and easy to verify proofs of validity or revocation. One embodiment of the present invention is a modification to the NOVOMODO system of Micali. By replacing the hash chains in Micali's construction with grounded dense hash trees, a number of desirable tradeoffs are achieved.

Having already described the NOVOMODO scheme, one embodiment of the present invention that utilizes grounded dense hash trees is described. At a high level, the embodiment of the present invention replaces the NOVOMODO hash chains with grounded dense hash trees. As already mentioned, these are akin to Merkle trees except that interior nodes are also used in validation.

Set Up

As in NOVOMODO, let D denote traditional certificate data. The certificate authority associates two numbers with the certificate data D. These two numbers, $Y_r$ and $N_1$, are computed as follows. The certificate authority constructs a grounded dense hash tree and sets $y_r$ to be value assigned to the root of that tree. The certificate authority sets $N_1=f(N_0)$ like was done for NOVOMODO. The certificate consists of the augmented data ($D, y_r, N_1$) together with the certificate authority's signature on this data.

FIG. 1 is a flow diagram of one embodiment of a process by which a certificate authority operates in a set-up phase. The process is performed by processing logic that may comprise hardware (e.g., circuitry, dedicated logic, etc.), software (such as is run on a general purpose computer system or a dedicated machine), or a combination of both.

Referring to FIG. 1, the process begins with processing logic establishing a number of validity periods (processing block 101). Next, for each user processing logic creates a grounded dense hash tree (processing block 102). In doing so, processing logic denotes the value of the root equal to the variable Y. Processing logic then sets the value of the root to be a validity target (processing block 103). Processing logic creates revocation target $N_1$ (processing block 104).

After creating the validity and revocation targets, processing logic then constructs certificate data consisting of traditional certificate data as set forth above together with validity and revocation targets (processing block 105). Then after processing logic constructs the certificate consisting of augmented certificate data (the traditional certificate data with the validity and revocation targets) together with the certificate authority's signature on the augmented certificate data (processing block 106). Then processing logic issues a certificate to the owner (processing block 107).

Figure 5:
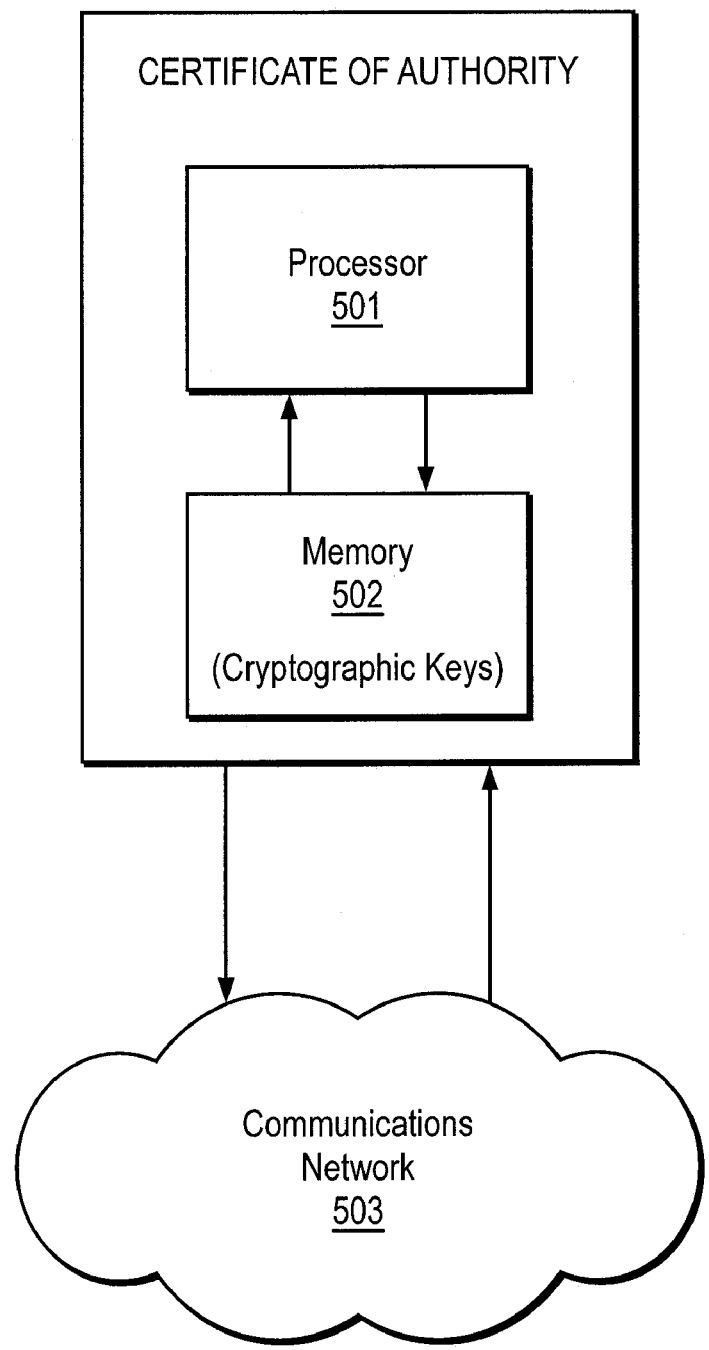
FIG. 5 illustrates a component that may represent a certificate authority component, a verifier component, or an owner component in accordance with one embodiment of the present invention.

FIG. 5 is a block diagram of one embodiment of a system component. The system component may be a certificate authority component, a verifier component, or an owner component. Each component includes a processor in bidirectional communication with a memory. The processor executes suitable program code for carrying out the procedures described above to issue, revoke, validate, and verify certificates. The processor also executes suitable program code for generating information to be transmitted to other components. Suitable program code may be created according to methods known in the art. The memory stores the program code, as well as intermediate results and other information used during execution of the certificate issuance, revocation, validation, and verification procedures.

Referring to FIG. 5, the component comprises a processor 501 and a memory 502. These components operate together to perform the operations described herein. For example when processor 501 and memory 502 comprise a certificate authority component, they operate together to perform the operations of the flow diagram depicted in FIG. 1. Similarly, in the case where the processor 501 and memory 502 operate together comprise a verifier component, they perform the functions of the flow diagram set forth in FIG. 4. Moreover, when processor 501 and memory 502 operate together as an owner component, they perform the operations set forth in FIG. 3.

A communications network is provided over which the entities may communicate. The communications network may be of various common forms, including, for example, a LAN computer network, a WAN computer network, and/or a mobile telephone network.

Figure 3:
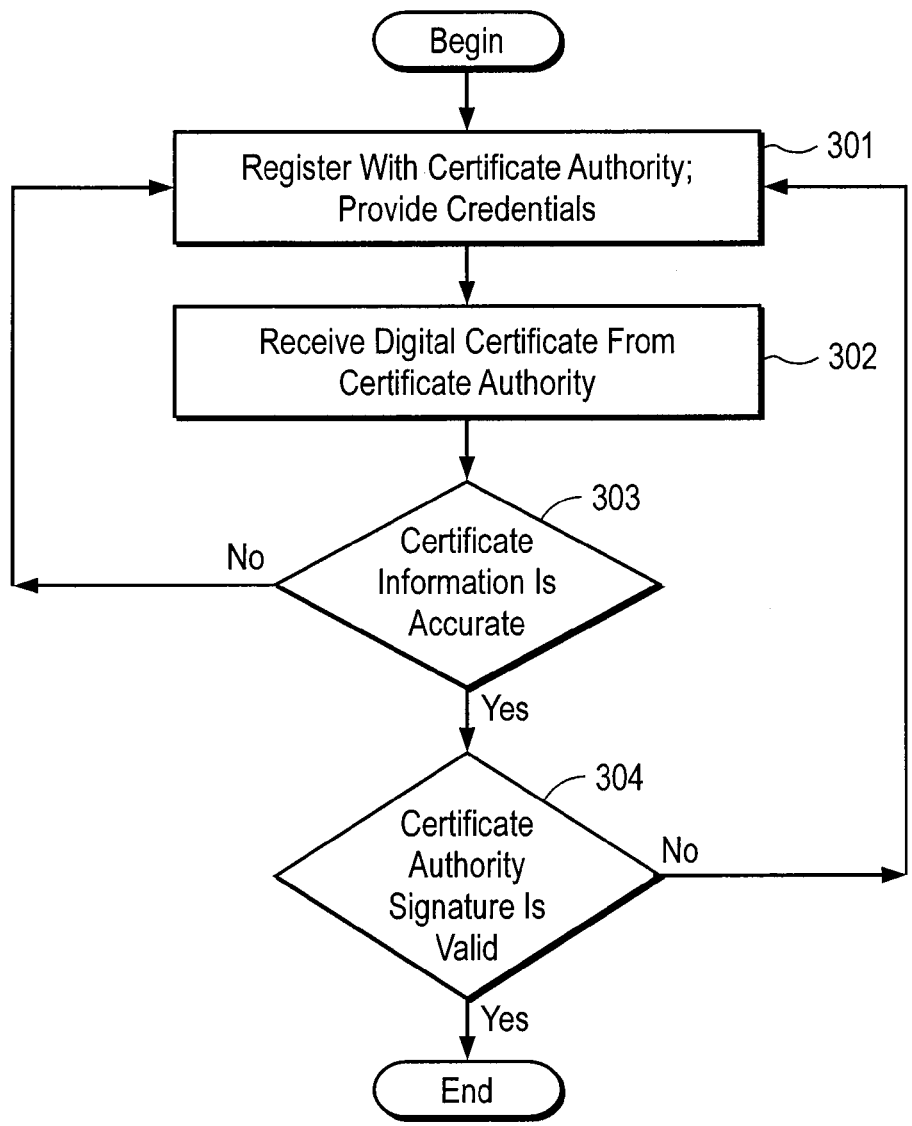
FIG. 3 illustrates a flow diagram of one embodiment of a process for the certificate owner during actual use.

FIG. 3 is a flow diagram of one embodiment of a process by which a certificate owner operates during actual use. The process is performed by processing logic that may comprise hardware (e.g., circuitry, dedicated logic, etc.), software (such as is run on a general purpose computer system or a dedicated machine), or a combination of both.

Referring to FIG. 3, the process begins by processing logic registering with the certificate authority and providing credentials thereto (processing block 301). Then, processing logic receives a digital certificate from the certificate authority (processing block 302). After receiving the digital certificate, processing logic tests whether the certificate information is accurate (processing block 303). If it is not, processing logic transitions back to processing block 301 and the process repeats. If the certificate information is accurate, processing logic tests whether the certificate authority signature is valid (processing block 304). If it is not, processing transitions to processing block 301 where the process is repeated. If the certificate authority's signature is valid, the process ends.

Periodic Certificate Updates

In one embodiment, the directory is updated each period. At period i, the certificate authority sends out a value c for each certificate that is computed as follows. In one embodiment, if the certificate is valid, then the certificate authority sends out the Value(gv(i)), together with Value(CoNodes(gv(i))). If the certificate has been revoked, the certificate authority sends out $N_0$.

Figure 2:
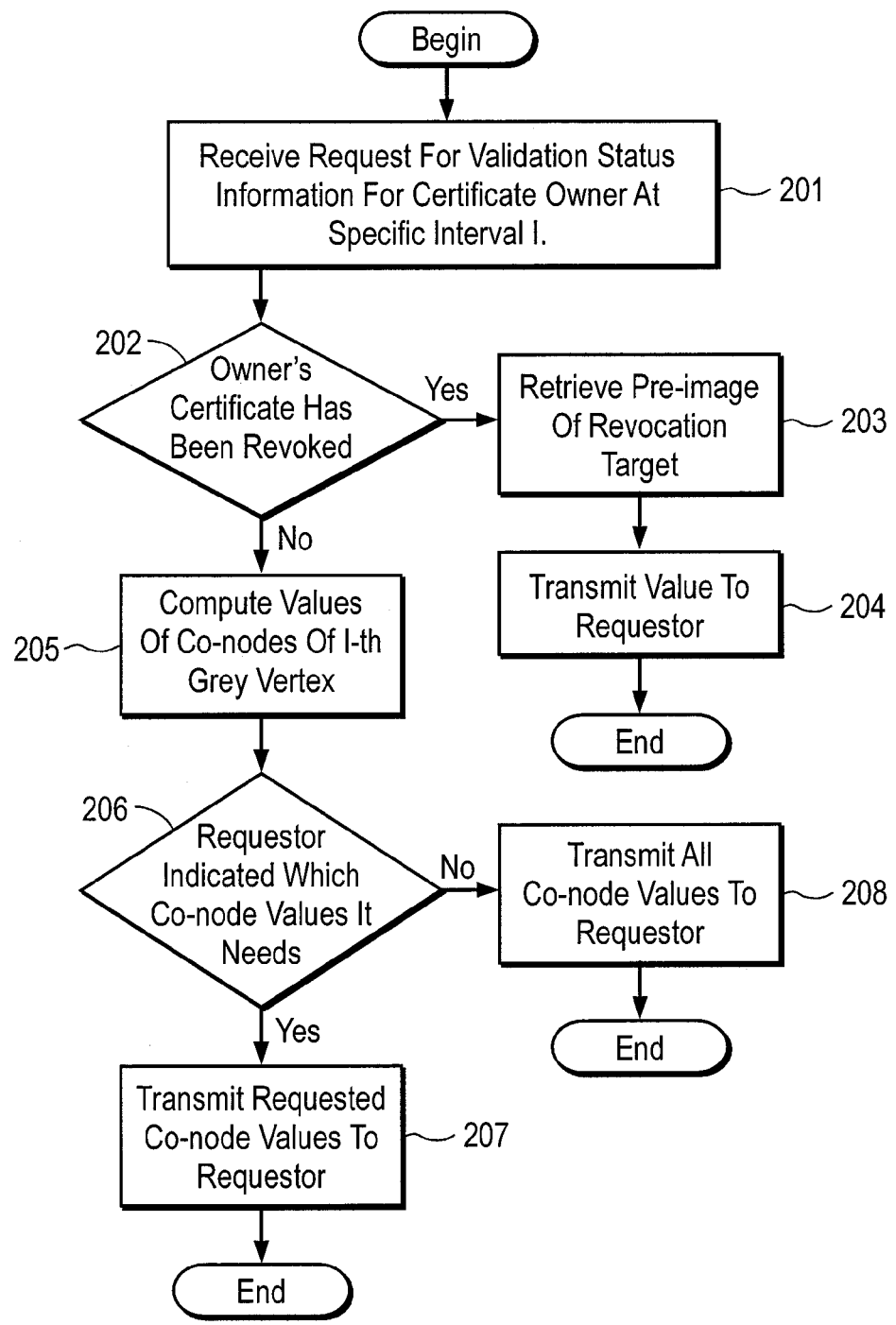
FIG. 2 illustrates a flow diagram of one embodiment of a process for the Certificate Authority in the set up phase.

FIG. 2 is a flow diagram of one embodiment of a process by which the certificate authority operates during actual use. The process is performed by processing logic that may comprise hardware (e.g., circuitry, dedicated logic, etc.), software (such as is run on a general purpose computer system or a dedicated machine), or a combination of both.

Referring to FIG. 2, the process begins by processing logic receiving a request for validation status information for a certificate owner at a specific interval i (processing block 201). Next, processing logic tests whether the owner's certificate has been revoked (processing block 202). If it has, processing logic transitions to processing block 203 where processing logic retrieves a pre-image of the revocation target, transmits the value to the requester (processing block 204), and the process ends. If the owner's certificate has not been revoked, processing logic computes values of co-nodes of the i-th grey vertex (processing block 205) and tests whether the requester indicates which co-node values it needs (processing block 206). If it did not, processing logic transmits all co-node values to the requestor (processing block 208) and the process ends. If the requestor has indicated which co-node values it needs, processing logic transmits the requested co-node values to the requestor (processing block 207) and the process ends.

Verifying Certificate Status

Suppose a user wants to verify the status of a certificate at period i. If the certificate authority claims the certificate has been revoked, then the user takes the value $N_0$ sent by the certificate authority and determines whether indeed $N_1=f(N_0)$. If the certificate authority claims the certificate has not been revoked, then the user takes the values Value(gv(i)) and Value(CoNodes(gv(i))) and uses them to compute the grounded dense hash tree root value. If the computed Merkle root matches the value $y_r$, then the certificate is valid.

Alternatively, if the user has already verified a certificate for a previous period j and has the relevant verification information, and the vertex associated with certificate i is in the subtree rooted at the vertex associated with the certificate for period j, then the user only needs to use the co-nodes to compute up to that root.

Figure 4:
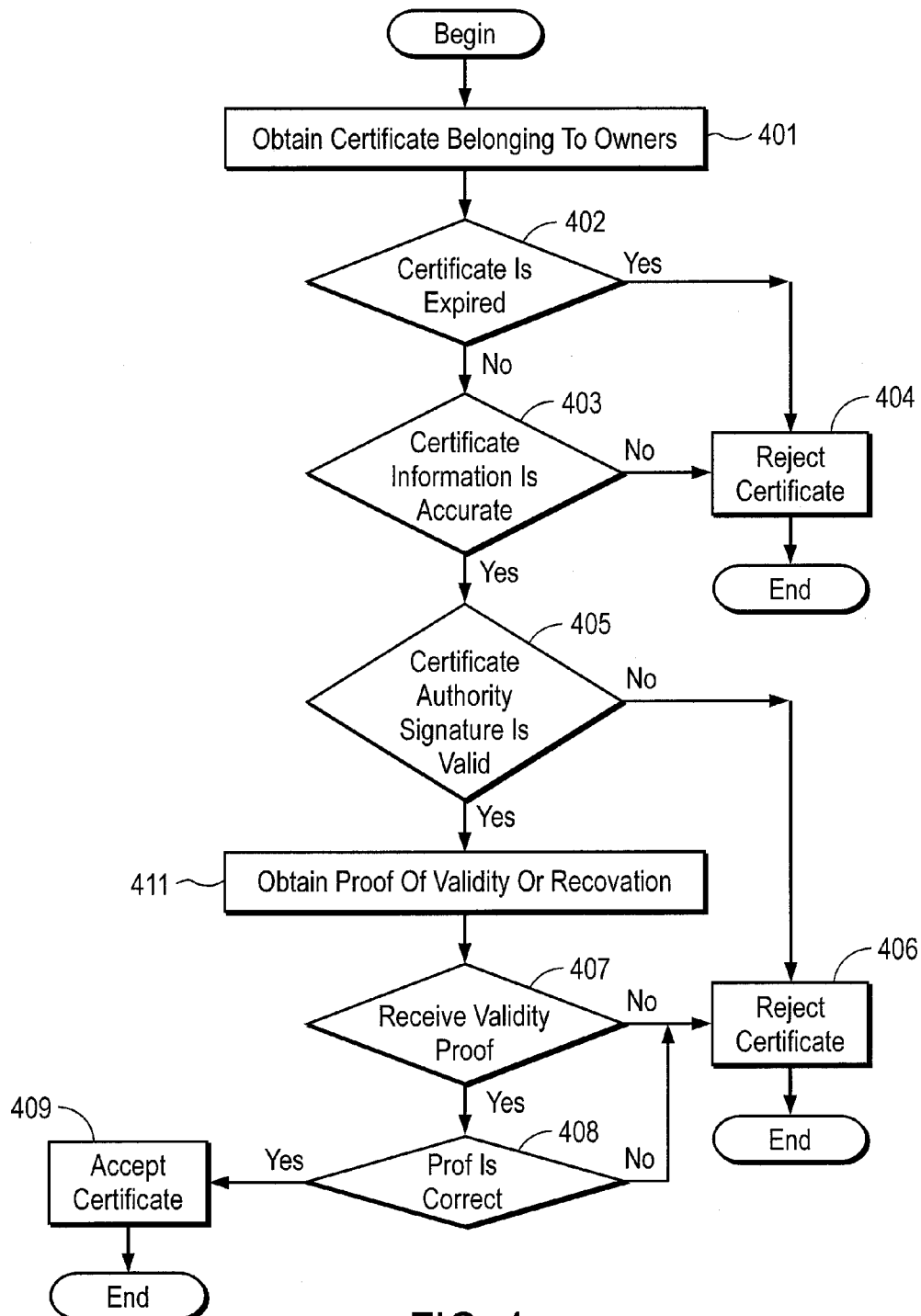
FIG. 4 illustrates a flow diagram of one embodiment of a process for the certificate verifier during actual use.

FIG. 4 is a flow diagram of one embodiment of a process by which the certificate verifier operates during actual use. The process is performed by processing logic that may comprise hardware (e.g., circuitry, dedicated logic, etc.), software (such as is run on a general purpose computer system or a dedicated machine), or a combination of both.

Referring to FIG. 4, the process begins with processing logic obtaining a certificate belonging to an owner (processing block 401). Processing logic then tests whether the certificate is expired (processing block 402). If it is, processing logic rejects the certificate (processing block 404) and the process ends. If the certificate is not expired, processing logic tests whether the certificate information is accurate (processing block 403). If it is not, processing logic rejects the certificate (processing block 404) and the process ends. If the certificate information is accurate, processing logic tests whether the certificate authority's signature is valid (processing block 405). If it is not, processing logic rejects the certificate (processing block 404) and the process ends. If the certificate authority's signature is valid, processing logic obtains proof of the validity or revocation (processing block 411).

Afterwards, processing logic tests whether the validity proof has been received (processing block 407). If it has not, processing logic rejects the certificate (processing block 406) and the process ends. If processing logic has received the validity proof, processing logic tests whether the proof is correct (processing block 408). If it is not, processing logic rejects the certificate (processing block 406) and the process ends. If the proof is correct, processing logic accepts the certificate (processing block 409) and the process ends.

Figure 6:
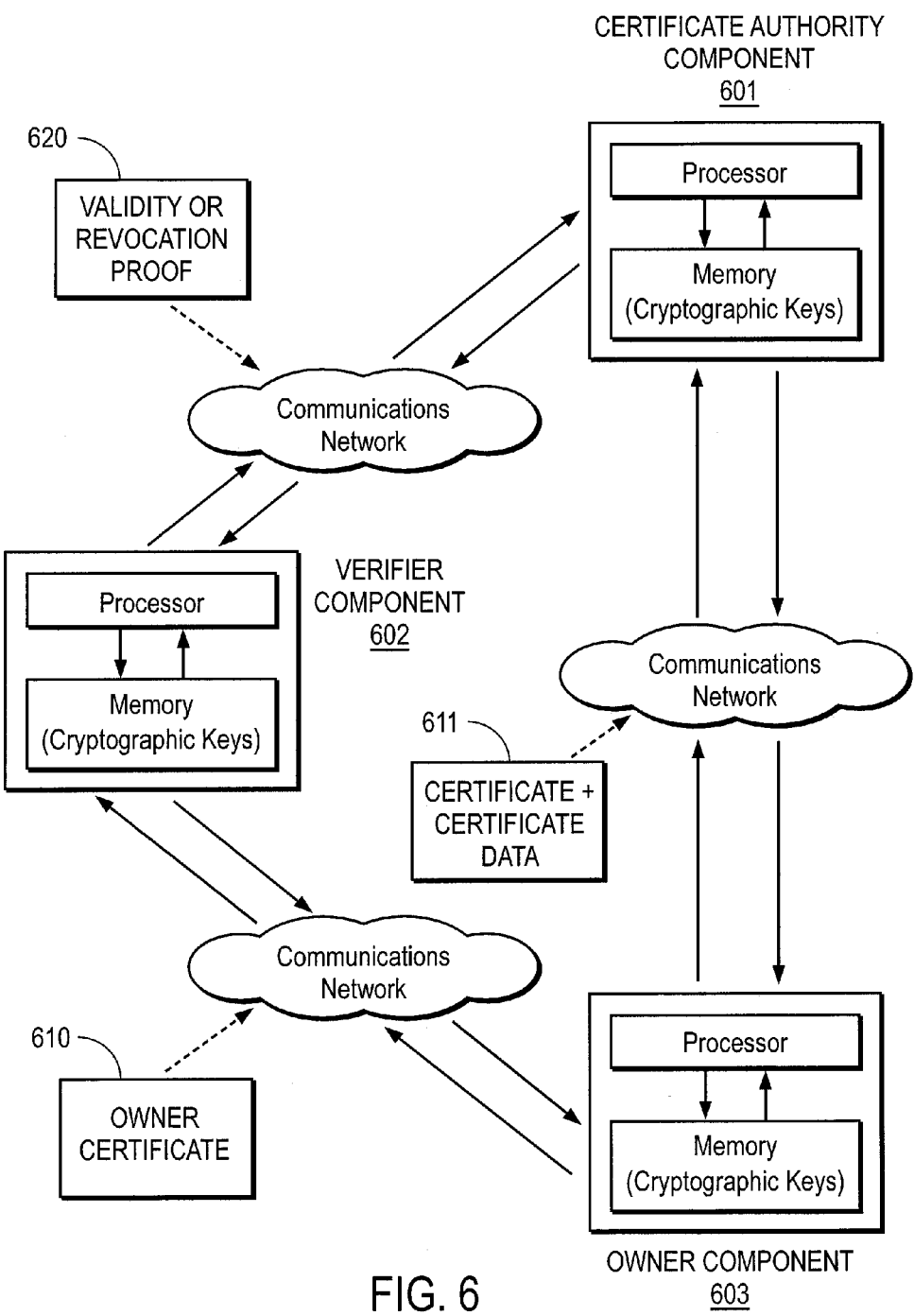
FIG. 6 illustrates a system configuration with a certificate authority, a certificate verifier, and a certificate owner in accordance with one embodiment of the present invention.

FIG. 6 is a system configuration with a certificate authority, a certificate verifier, and a certificate owner in accordance with one embodiment of the present invention. Referring to FIG. 6, a certificate authority component 601 is communicably coupled to a verifier component 602 and an owner component 603 via one or more communications networks. Verifier component 602 is communicably coupled to owner component 603 via a communications network. In one embodiment, each of these components comprises the component shown in FIG. 5. Certificate authority component 601 sends certificate and certificate data 611 to owner component 603. Verifier component 602 and owner component 603 exchange owner certificate 610. Verifier component 602 and certificate authority component 601 exchange validity or revocation proof 620.

Dense Hash Trees for Multi-Certificate Revocation

In an alternate embodiment of the present invention, multiple certificates may be revoked concurrently.

A generalized scheme is described below for revoking multiple certificates concurrently, followed by examples of how to instantiate it. To describe the scheme, the notion of a complement cover family is considered. Let U denote the set of all certificate holders (regardless of whether the certificate has been prematurely revoked). Let R be a subset of U denoting the set of certificate holders whose certificates have been revoked prior to expiration. Let $\overline{R}=U-R$. That is, $\overline{R}$ is the set of certificate holders whose certificates are currently not revoked.

Definition 1. Let S be a set consisting of subsets of U. S is a complement cover of R if $$\cup_{w \in S} = \overline{R}.$$

Definition 2. Let F be a set consisting of subsets of U. F is a complement cover family of U if and only if for every subset R of U, F contains a complement cover of R. That is, for every subset R of U, there is a subset S of F such that S is a complement cover of R.

One simple example of a complement cover family is the set of all singletons. That is, if $U=\{u_1, \ldots, u_N\}$, then the set $F=\{\{u_1\}, \ldots, \{u_N\}\}$ is easily seen by one well versed in the art to be a complement cover. Similarly, the power set of any set is also trivially seen to be a complement cover family. A power set of a set is the set of all subsets:

$$P(U)=W\{W|W \subseteq U\}.$$

At a high level, the certificate authority first constructs a complement cover family for the universe of certificate holders. Next, the certificate authority assigns a hash chain to each element of the complement cover family. For a given certificate owner, let F(Owner) denote the set of elements of F to which the user belongs. The certificate authority incorporates, in its certificate for a user, the roots of the hash chains corresponding to the elements of F(Owner) as the validation targets. Now, to provide a validation proof at period i for a group of users, the certificate authority first determines the set of revoked users R. Then, the certificate authority computes the complement cover of R contained in F, referred to herein as S. Note that such a complement cover S exists since F is a complement cover family for the universe U. The certificate authority produces the $i^{th}$ value in the associated hash chain for each element of S. To check the validity of a user's certificate, a verifier simply needs to check that at least one element of S is in F(Owner).

Set Up

Let f be a function that is one way on its iterates. Let U denote the universe of all certificate holders. Then the certificate authority constructs a complement cover family; call it F, of U. For each element of F, the certificate authority constructs an independent grounded dense hash tree that allows for p periods.

Let D denote traditional certificate data (e.g., a serial number, a string that serves as the user's identity, an issue date, and an expiration date). Let p denote the number of periods in the certificate scheme. The certificate authority associates with the certificate data a set of validation targets and a single revocation target as follows. The certificate authority selects a value $N_0$ at random from $\{0,1\}^n$. He sets $N_1=f(N_0)$—where $N_1$ represents the revocation target.

Then the certificate authority constructs a set of validity targets for the certificate owner as follows. The certificate authority computes F(Owner), which is the set consisting of elements of F for which the Owner is a member. Suppose that there are k elements of F(Owner), referred to as $F_1; \ldots; F_k$. Let $r_1; \ldots; r_k$, denote the values of the roots of the grounded dense hash trees associated with $F_1 \ldots F_k$.

The certificate consists of the augmented data $\langle D, r_1; \ldots; r_k; N_1 \rangle$ together with the certificate authority's signature on this data.

Periodic Certificate Updates

The directory is updated each period. At period i, the certificate authority sends out the following values. If a given certificate is revoked, then the certificate authority sends out the pre-image of the revocation target; this is the $N_0$ value associated with each certificate. If the certificate is valid, then the certificate authority performs the following. The certificate authority first determines the set R of revoked holders. The certificate authority computes the element S∈F such that S is a complement cover for R. Such a S exists since F is complement cover for the universe U. For each element of S, the certificate authority sends out the value Value(gv(i)) associated with the tree corresponding to that element, together with Value(CoNodes(gv(i))).

Verifying Certificate Status

Suppose that the user wants to verify the status of a certificate belonging to the owner at period i. The user first checks that the certificate has not itself expired and that the signature by the certificate authority is valid. Now, if the certificate authority claims the certificate has been revoked, then the user takes the value $N_0$— sent by the certificate authority and checks if indeed $N_1=f(N_0)$. If the certificate authority claims the certificate has not been revoked, then the user takes the values Value(gv(i)) and Value(CoNodes(gv(i))) associated with the element of the complement cover that is in F(Owner). The user computes the grounded dense hash tree root value. If the computed root matches the root contained in the certificate, then the certificate is valid.

Alternatively, if the user has already verified a certificate for a previous period j and has the relevant verification information, and the vertex associated with certificate i is in the subtree rooted at the vertex associated with the certificate for period j, then the user only needs to use the co-nodes to compute up to that root.

Tree Construction of Complement Cover Families

One construction of a complement cover family is a binary tree hierarchy. Such a complement cover family is constructed as follows. For simplicity, assume that the number of certificate holders is $2^k$ for some non-negative integer k. Create a binary tree with $2^k$ leaves. Now, a subset of the universe of certificate holders is assigned to every vertex. Since there are $2^k$ leaves, each leaf can correspond to a unique certificate holder. Each leaf is assigned to the singleton set consisting of a single certificate holder. Now, at each internal node, the subset corresponding to the union of the subsets of the nodes of its children is assigned. That is, at a given vertex, the subset corresponds to the certificate holders at the leaves of the subtree rooted at that vertex. Observe now that the subset associated with the root consists of the entire universe. The complement cover family F will consist of the sets assigned to all the vertices. It is clear that F forms a complement cover family. In particular, since every certificate holder is represented as a singleton at the leaf, any arbitrary subset can be constructed. However, it is more efficient if the owners whose leaves form a complete subtree form a cover using the set associated with the root of that subtree. In particular, to construct a complement cover of any subset $R \subseteq U$ of minimal size (i.e., containing the smallest number of sets) one does the following steps.

1. First "mark" every leaf vertex corresponding to an element of $\overline{R}$;
2. Second, "mark" every interior vertex that is along the path from a marked leaf vertex to the root;
3. Third, determine the vertices that are non-marked, but whose parents are marked;
4. Fourth, consider the subsets associated with these vertices. These subsets form a complement cover of $\overline{R}$ which is of minimal size. The method need not be limited to binary trees, and indeed extends in a straightforward manner to any general tree.

An Exemplary Computer System

Figure 10:
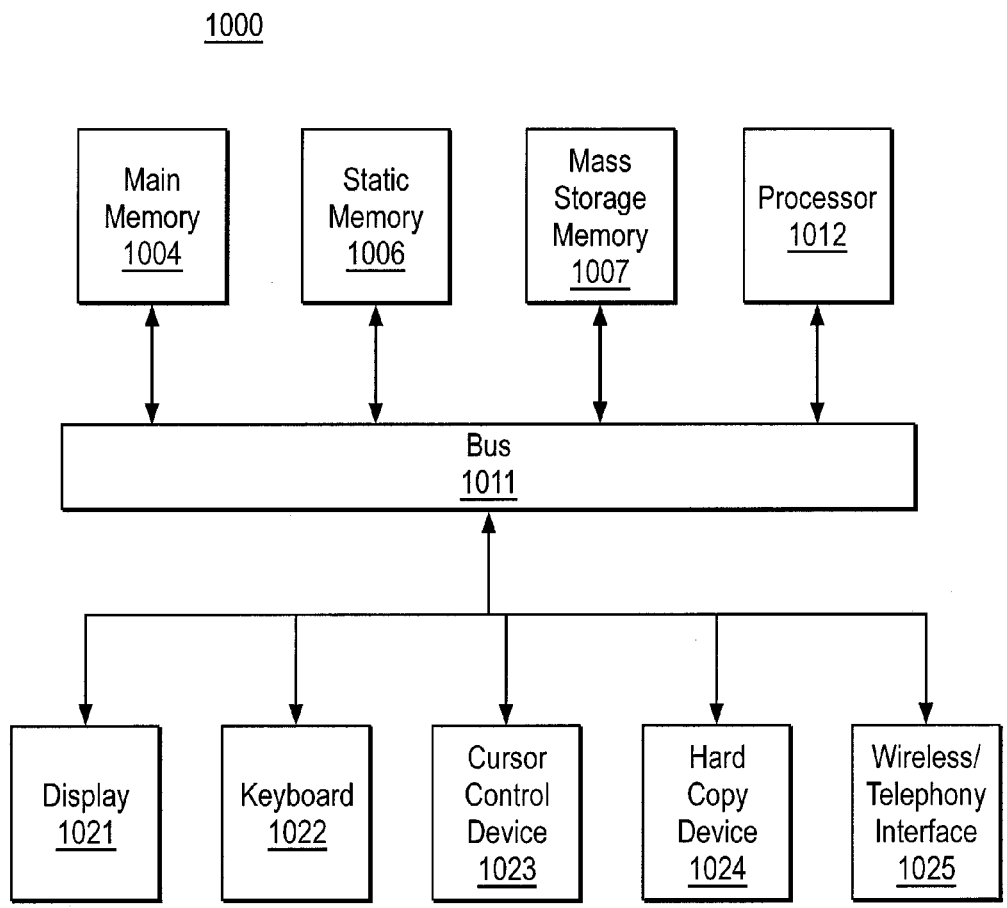
FIG. 10 is a block diagram of an exemplary computer system.

FIG. 10 is a block diagram of an exemplary computer system that may perform one or more of the operations described herein. Referring to FIG. 10, computer system 1000 may comprise an exemplary client 1050 or server 1000 computer system. Computer system 1000 comprises a communication mechanism or bus 1011 for communicating information, and a processor 1012 coupled with bus 1011 for processing information. Processor 1012 includes a microprocessor, but is not limited to a microprocessor, such as, for example, Pentium™, PowerPC™, Alpha™, etc.

System 1000 further comprises a random access memory (RAM), or other dynamic storage device 1004 (referred to as main memory) coupled to bus 1011 for storing information and instructions to be executed by processor 1012. Main memory 904 also may be used for storing temporary variables or other intermediate information during execution of instructions by processor 1012.

Computer system 1000 also comprises a read only memory (ROM) and/or other static storage device 1006 coupled to bus 1011, for storing static information and instructions for processor 1012, and a data storage device 1007, such as a magnetic disk or optical disk and its corresponding disk drive. Data storage device 1007 is coupled to bus 1011 for storing information and instructions.

Computer system 1000 may further be coupled to a display device 1021, such as a cathode ray tube (CRT) or liquid crystal display (LCD), coupled to bus 1011 for displaying information to a computer user. An alphanumeric input device 1022, including alphanumeric and other keys, may also be coupled to bus 1011 for communicating information and command selections to processor 1012. An additional user input device is cursor control 1023, such as a mouse, trackball, trackpad, stylus, or cursor direction keys, coupled to bus 1011 for communicating direction information and command selections to processor 1012, and for controlling cursor movement on display 1021.

Another device that may be coupled to bus 1011 is hard copy device 1024, which may be used for printing instructions, data, or other information on a medium such as paper, film, or similar types of media. Furthermore, a sound recording and playback device, such as a speaker and/or microphone may optionally be coupled to bus 1011 for audio interfacing with computer system 1000. Another device that may be coupled to bus 1011 is a wired/wireless communication capability 1025 to communication to a phone or handheld palm device.

Note that any or all of the components of system 1000 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

We claim:

1. A method comprising:
generating, using an electronic computing device, certificate data having validity and revocation targets, the validity target being a value of a root of a grounded dense hash tree; and
issuing a certificate with the certificate data.

2. The method defined in claim 1 wherein the certificate data further includes one or more of a group consisting of: a public key, a serial number, a string to serve as an identity of an owner of the certificate, an issue date, and an expiration date.

3. The method defined in claim 1 wherein the grounded dense hash tree includes a bottom row of leaves augmented with hash chains.

4. The method defined in claim 1 wherein the grounded hash tree comprises a balanced binary tree on top of a bottom level of vertices, wherein randomly chosen values are assigned to the bottom level of vertices, and a value generated as a result of a one-way function for each vertex in a layer on top of the bottom level of vertices.

5. The method defined in claim 1 wherein the certificate further comprises a signature of a certificate authority on the certificate data having the validity and revocation targets.

6. The method defined in claim 1 further comprising updating validity of the certificate periodically, including issuing a new value for the revocation target.

7. An article of manufacture having one or more non-transitory computer readable storage media storing instructions thereon which, when executed by a system, cause the system to perform a method comprising:
constructing certificate data having validity and revocation targets, the validity target being a value of a root of a grounded dense hash tree; and
issuing a certificate with the certificate data.

8. The article of manufacture defined in claim 7 wherein the certificate data further includes one or more of a group consisting of: a public key, a serial number, a string to serve as an identity of an owner of the certificate, an issue date, and an expiration date.

9. The article of manufacture defined in claim 7 wherein the grounded dense hash tree includes a bottom row of leaves augmented with hash chains.

10. The article of manufacture defined in claim 7 wherein the grounded dense hash tree comprises a balanced binary tree on top of a bottom level of vertices, wherein randomly chosen values are assigned to the bottom level of vertices, and a value generated as a result of a one-way function for each vertex in a layer on top of the bottom level of vertices.

11. The article of manufacture defined in claim 7 wherein the certificate further comprises a signature of a certificate authority on the certificate data having the validity and revocation targets.

12. The article of manufacture defined in claim 7 further comprising updating validity of the certificate periodically, including issuing a new value for the revocation target.

13. An apparatus comprising:
an external network interface;
a memory; and
a processor coupled to the external network interface and the memory, wherein the processor issues a certificate having certificate data with validity and revocation targets, wherein the validity target is a value of a root of a grounded dense hash tree.

14. An apparatus comprising:
means for generating certificate data having validity and revocation targets, the validity target being a value of a root of a grounded dense hash tree; and
means for issuing a certificate with the certificate data.

15. A method comprising:
accessing a proof of validity for a plurality of certificates; and
determining, using an electronic computing device, the validity of multiple certificates of the plurality of certificates using a single grounded dense hash tree.

16. An apparatus comprising:
an external network interface through which a request for validation status information for a certificate at a specific interval is made;
a memory; and
a processor coupled to the external network interface and the memory, wherein the processor accesses a proof of validity for a plurality of certificates and determines the validity of multiple certificates of the plurality of certificates using a single grounded dense hash tree.

17. A method comprising:
determining whether a plurality of certificates are valid using a single grounded dense hash tree; and
handling, using an electronic computing device, a revocation proof via a single digital signature amortized over a plurality of validity proofs.

18. An apparatus comprising:
an external network interface through which a request for validation status information for a certificate at a specific interval is made;
a memory; and
a processor coupled to the external network interface and the memory, wherein the processor handles a validity proof using a single grounded dense hash tree and a revocation proof via a digital signature.

19. A method comprising:
accessing a proof of validity for a certificate; and
determining, using an electronic computing device, the validity of the certificate using a grounded dense hash tree.

20. An apparatus comprising:
an external network interface through which a request for validation status information for a certificate at a specific interval is made;
a memory; and
a processor coupled to the external network interface and the memory, wherein the processor accesses a proof of validity for a certificate and determines the validity of the certificate using a grounded dense hash tree.

* * * * *